(12) United States Patent
Lee (10) Patent No.: US 11,138,780 B2
(45) Date of Patent: *Oct. 5, 2021

(54) METHOD AND DEVICE FOR SETTING A MULTI-USER VIRTUAL REALITY CHAT ENVIRONMENT

(71) Applicant: NANNING FUGUI PRECISION INDUSTRIAL CO., LTD., Nanning (CN)

(72) Inventor: Cheng-Yu Lee, New Taipei (TW)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/005,623

(22) Filed: Aug. 28, 2020

(65) Prior Publication Data

US 2020/0394829 A1 Dec. 17, 2020

Related U.S. Application Data

(63) Continuation of application No. 16/367,388, filed on Mar. 28, 2019, now Pat. No. 10,846,898.

(51) Int. Cl.
*G06T 11/60* (2006.01)
*G10L 25/51* (2013.01)
*G06F 3/0482* (2013.01)
*H04L 12/18* (2006.01)

(52) U.S. Cl.
CPC .......... *G06T 11/60* (2013.01); *G06F 3/0482* (2013.01); *G10L 25/51* (2013.01); *H04L 12/1813* (2013.01); *G06T 2200/24* (2013.01)

(58) Field of Classification Search
CPC ... G06T 11/60; G06T 2200/24; G06F 3/0482; G10L 25/51; H04L 12/1813
See application file for complete search history.

(56) References Cited

U.S. PATENT DOCUMENTS

| | | | |
|---|---|---|---|
| 6,241,609 B1 * | 6/2001 | Rutgers | A63F 13/12 463/31 |
| 6,784,901 B1 * | 8/2004 | Harvey | H04L 12/1827 709/204 |
| 8,187,093 B2 * | 5/2012 | Hideya | H04S 7/301 463/32 |
| 8,424,075 B1 * | 4/2013 | Walsh | H04L 63/0263 726/11 |
| 8,653,349 B1 * | 2/2014 | White | G10H 1/0025 84/600 |
| 9,195,305 B2 * | 11/2015 | Markovic | G06F 3/017 |
| 9,311,742 B1 * | 4/2016 | Glover | G06T 13/00 |
| 9,729,820 B1 | 8/2017 | Holmes | |
| 10,168,768 B1 * | 1/2019 | Kinstner | G06F 3/011 |
| 10,181,218 B1 * | 1/2019 | Goetzinger, Jr. | G06T 19/00 |
| 10,225,656 B1 * | 3/2019 | Kratz | G06T 13/205 |
| 10,275,098 B1 * | 4/2019 | Clements | G06F 3/011 |
| 10,768,776 B1 * | 9/2020 | Roche | G06F 3/04815 |
| 10,776,933 B2 * | 9/2020 | Faulkner | G06F 3/011 |

(Continued)

*Primary Examiner* — Daeho D Song
(74) *Attorney, Agent, or Firm* — ScienBizip, P.C.

(57) ABSTRACT

A method for setting a multi-user virtual reality chat environment. The method adjusts a distance between avatars of participants in the VR chat scene from a first distance to a second distance according to detected volume received from the participants.

6 Claims, 11 Drawing Sheets

(56) References Cited

U.S. PATENT DOCUMENTS

| | | | |
|---|---|---|---|
| 10,846,898 B2* | 11/2020 | Lee | H04L 12/1818 |
| 11,054,272 B2* | 7/2021 | Bejot | G01C 21/20 |
| 2001/0044725 A1* | 11/2001 | Matsuda | G10L 19/00 |
| | | | 704/269 |
| 2002/0013813 A1* | 1/2002 | Matsuoka | H04M 3/567 |
| | | | 709/204 |
| 2003/0234859 A1* | 12/2003 | Malzbender | H04N 21/44012 |
| | | | 348/14.05 |
| 2004/0109023 A1* | 6/2004 | Tsuchiya | A63F 13/12 |
| | | | 715/758 |
| 2008/0294721 A1* | 11/2008 | Berndt | H04M 3/56 |
| | | | 709/204 |
| 2009/0106670 A1* | 4/2009 | Berndt | H04L 12/1822 |
| | | | 715/757 |
| 2009/0240359 A1* | 9/2009 | Hyndman | H04L 65/4015 |
| | | | 700/94 |
| 2010/0077034 A1* | 3/2010 | Alkov | H04L 51/16 |
| | | | 709/206 |
| 2010/0077318 A1* | 3/2010 | Alkov | G06Q 10/107 |
| | | | 715/753 |
| 2011/0269540 A1* | 11/2011 | Gillo | A63F 13/35 |
| | | | 463/31 |
| 2012/0069131 A1* | 3/2012 | Abelow | G06Q 10/067 |
| | | | 348/14.01 |
| 2012/0131478 A1* | 5/2012 | Maor | G06Q 10/101 |
| | | | 715/757 |
| 2013/0083154 A1* | 4/2013 | Kim | H04L 65/1069 |
| | | | 348/14.08 |
| 2013/0155169 A1* | 6/2013 | Hoover | H04N 7/157 |
| | | | 348/14.02 |
| 2013/0218688 A1* | 8/2013 | Roos | G06F 3/0482 |
| | | | 705/14.69 |
| 2013/0321568 A1* | 12/2013 | Suzuki | H04N 5/23238 |
| | | | 348/36 |
| 2016/0320847 A1* | 11/2016 | Coleman | G06F 3/011 |
| 2017/0034226 A1* | 2/2017 | Bostick | G06F 40/30 |
| 2017/0123752 A1* | 5/2017 | Nadler | G06T 13/205 |
| 2017/0132845 A1 | 5/2017 | Everman, II | |
| 2017/0326457 A1* | 11/2017 | Tilton | A63F 13/75 |
| 2017/0359467 A1* | 12/2017 | Norris | H04S 7/304 |
| 2018/0005439 A1* | 1/2018 | Evans | G06T 19/006 |
| 2018/0015362 A1* | 1/2018 | Terahata | A63F 13/26 |
| 2018/0045963 A1* | 2/2018 | Hoover | H04N 13/395 |
| 2018/0123813 A1* | 5/2018 | Milevski | H04L 12/1827 |
| 2018/0350144 A1* | 12/2018 | Rathod | G06Q 20/3276 |
| 2019/0026071 A1* | 1/2019 | Tamaoki | G06F 3/147 |
| 2019/0217198 A1* | 7/2019 | Clark | A63F 13/54 |
| 2019/0320143 A1* | 10/2019 | Izumihara | H04N 7/157 |
| 2019/0349464 A1* | 11/2019 | Ma | G04G 13/02 |
| 2019/0387299 A1* | 12/2019 | Evans | G06F 3/04815 |
| 2020/0099891 A1* | 3/2020 | Valli | H04N 7/147 |
| 2020/0311995 A1* | 10/2020 | Lee | G10L 25/57 |
| 2020/0371737 A1* | 11/2020 | Leppanen | G06F 3/1454 |
| 2020/0394829 A1* | 12/2020 | Lee | H04L 12/1818 |
| 2021/0037063 A1* | 2/2021 | Takahashi | G06T 19/006 |

* cited by examiner

METHOD AND DEVICE FOR SETTING A MULTI-USER VIRTUAL REALITY CHAT ENVIRONMENT

BACKGROUND

1. Technical Field

The disclosure relates to computer techniques, and more particularly to a method for providing a multi-user virtual reality chat environment.

2. Description of Related Art

A virtual reality (VR) system may provide various VR functions to support immersive user experiences. While a major part of VR adoption has been made within the gaming community for playing video games, VR application is not limited to the art of video gaming. As social activities supportive technologies, such as social networks, advance, building connections between VR and social technologies may unlock promising synergy. Hence, designing VR functions for social activities becomes an important research area in this field.

DETAILED DESCRIPTION

The disclosure provides a method for setting a multi-user virtual reality chat environment executable by an electronic device. The electronic device executing the disclosed method may be a VR device, a game console, a personal computer, or a smart phone.

Figure 1:
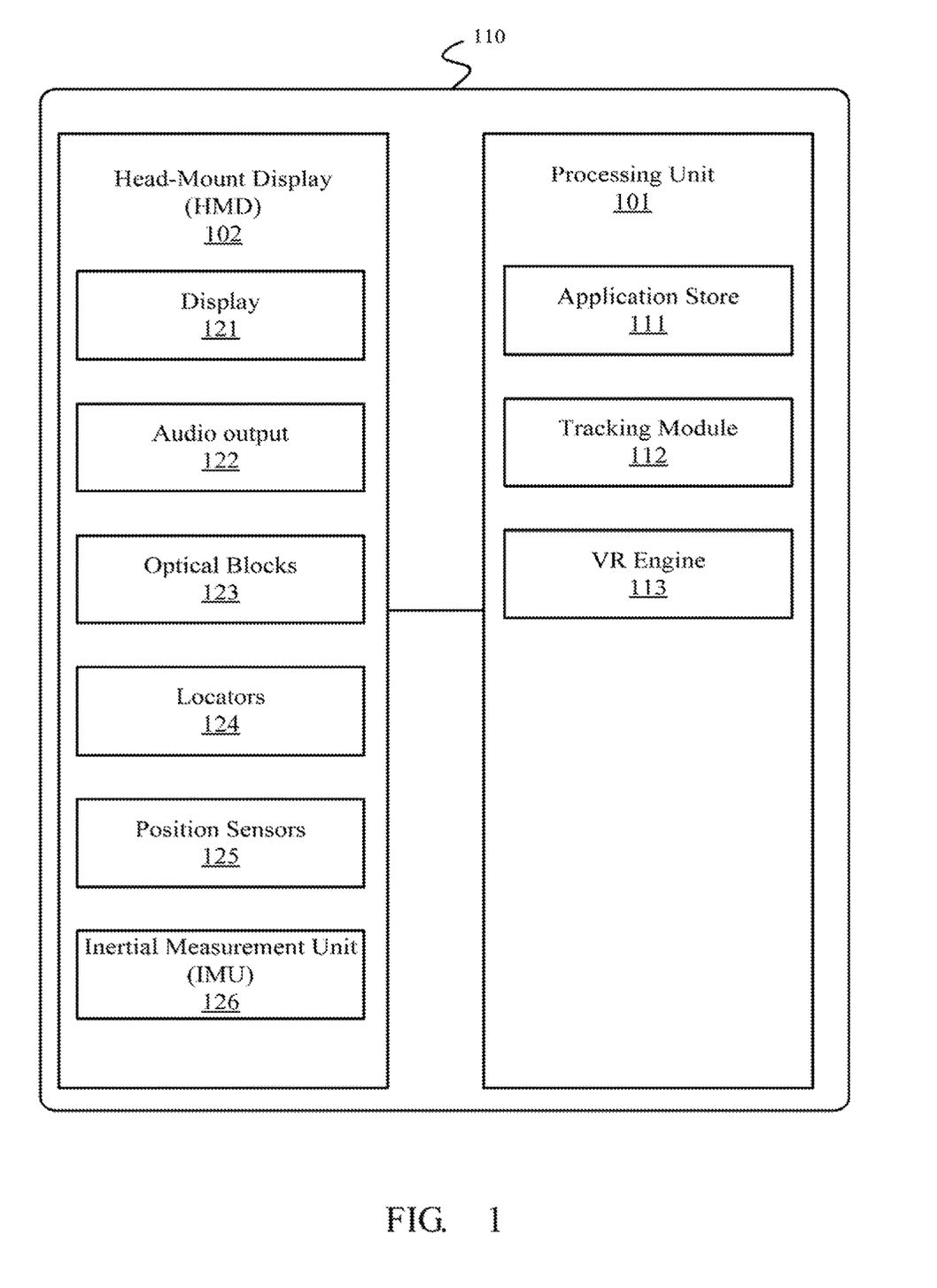
FIG. 1 is a block diagram of an embodiment of a virtual reality system of the disclosure.

With reference to FIG. 1, a VR system 110 for setting up a multi-user virtual reality chat environment has a head-mount display (HMD) 102 and a processing unit 101. The processing unit 101 outputs one or more virtual reality (VR) scenes to the HMD 102. The HMD 102 receives and displays the VR scene to an active user. The HMD 102 may be disposed on a wearable VR headset. The MD 102 provides VR visions to the active user when the wearable VR headset is put on and covers visions of the active user. The HMD 102 has a display 121, an audio output 122, optical blocks 123, locators 124, and position sensors 125, and an inertial measurement unit (IMU) 126. An exemplary embodiment of the HMD 102 may be referenced to a VR headset as disclosed in US patent publication No. 20170131774.

In some embodiments, the processing unit 101 may be a computer, a VR server, a smart phone, a gaming console, or any device capable of controlling and driving the HMD 102. An exemplary embodiment of the processing unit 101 may be referenced to a VR console as disclosed in US patent publication No. 20170131774. The processing unit 101 includes an application store 111, a tracking module 112, and a VR engine 113. The application store 111 stores VR applications. Each of the VR application provides at least one VR scene. The tracking module 112 tracks and outputs movement and positions of the HMD 102 to the VR engine 113. The VR engine 113 determines a position of an avatar of the active user in the VR scene.

Figure 2:
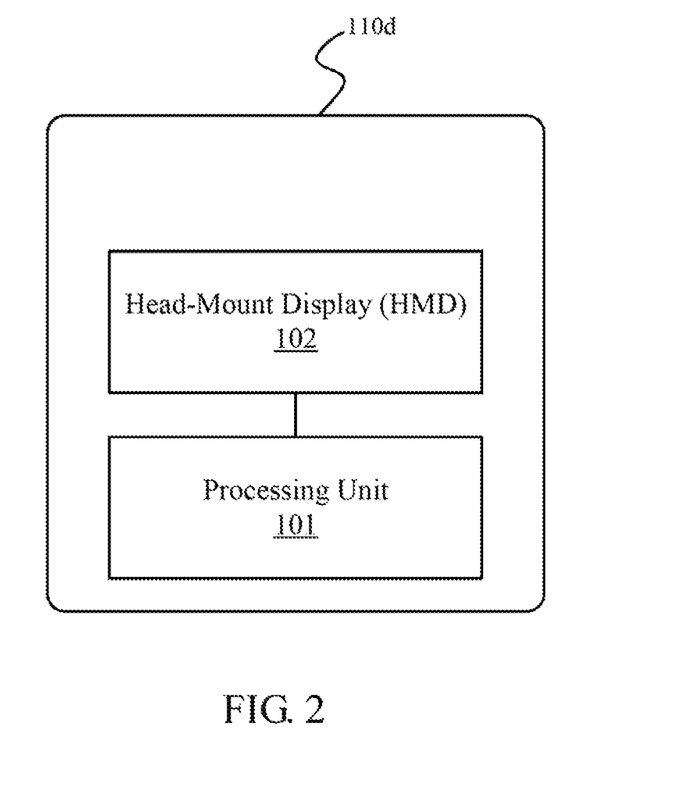
FIG. 2 is a block diagram of an alternative embodiment of a virtual reality system of the disclosure.

The processing unit 101 may connect to the HMD 102 through a wireless communication channel. Alternatively, the processing unit 101 may connect to the HMD 102 through a wire-lined communication channel. The processing unit 101 may be rigidly coupled to the HMD 102 such that the processing unit 101 and the HMD 102 act as a rigid entity. With reference to FIG. 2, for example, a VR device 110d is an embodiment of the VR system 110 wherein the processing unit 101 and the HMD 102 are rigidly coupled. Alternatively, the processing unit 101 may be non-rigidly coupled to the HMD 102 such that the HMD 102 is mobile related to the processing unit 101.

Figure 3:
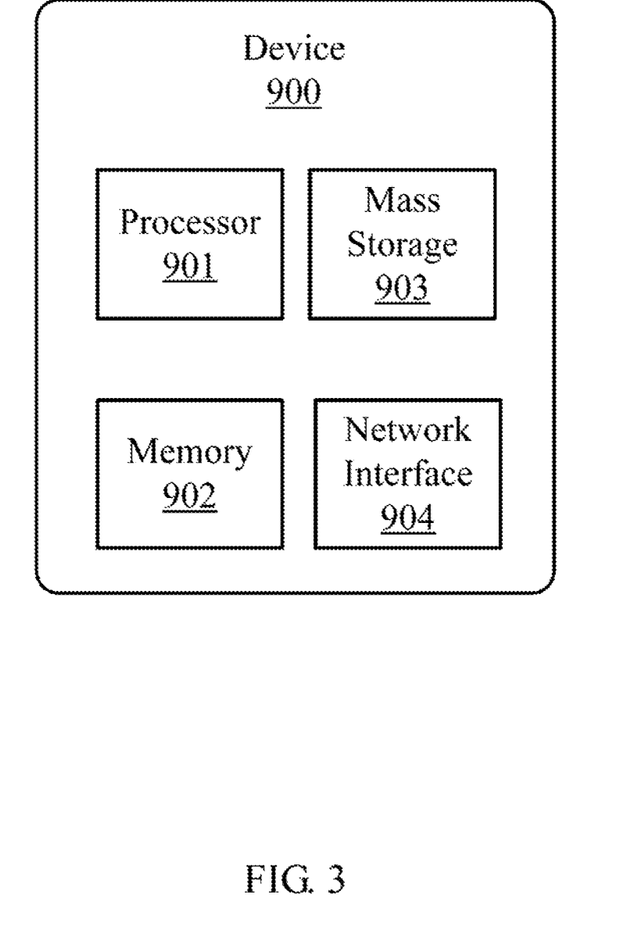
FIG. 3 is a block diagram of an embodiment of a virtual reality device executing a method of the disclosure.

With reference to FIG. 3, the method of the disclosure may be implemented by computer programs stored in storage media, such as mass storage 903 in a device 900. The computer programs implementing the method, when loaded to a memory 902 by a processor 901, directs the processor 901 in the device 900 to execute the method for setting up the multi-user virtual reality chat environment. The processor 901 communicates with other entities through a networking interface 904.

Figure 4:
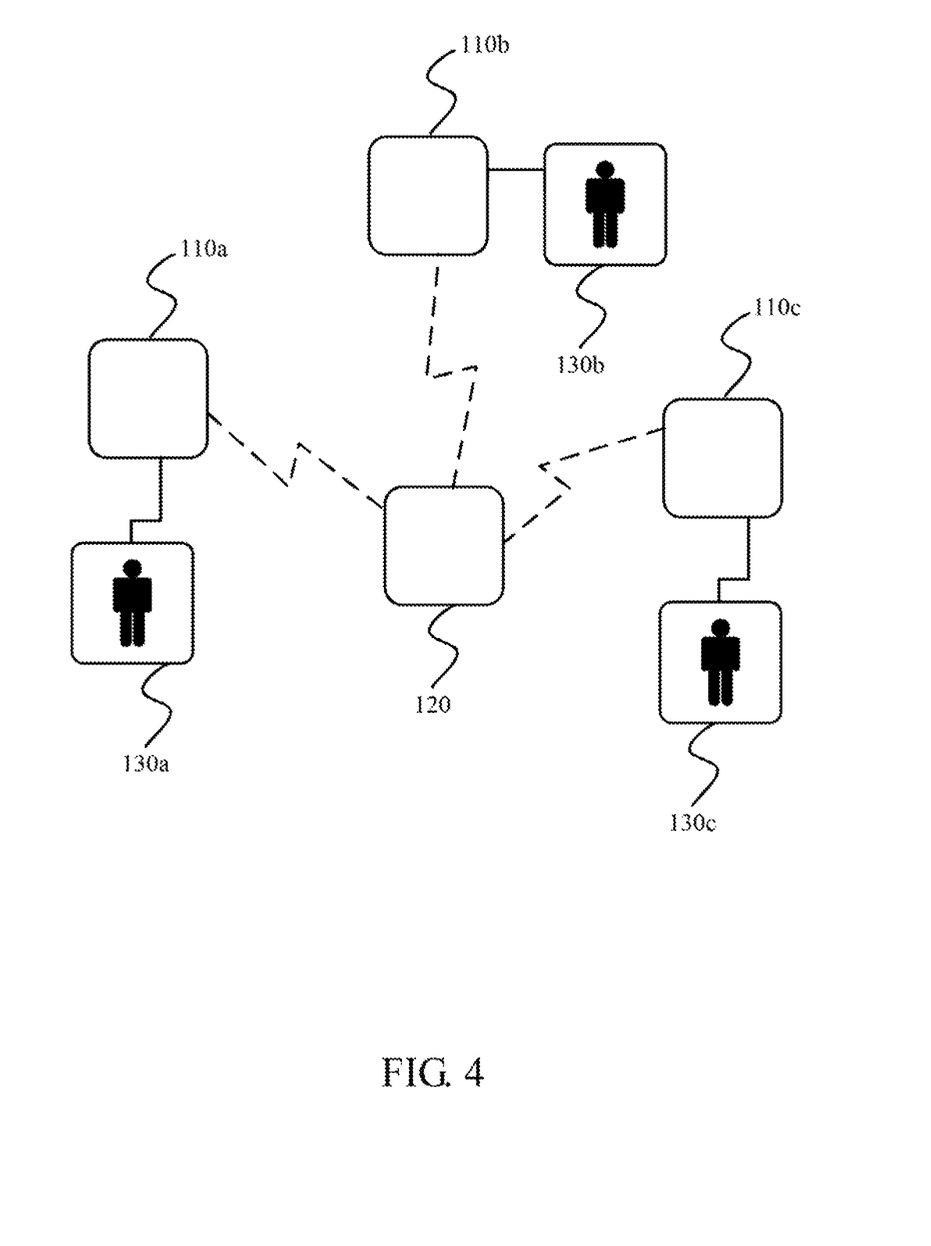
FIG. 4 is a block diagram of an embodiment of a plurality of participants joining a chat environment through a stand-alone VR server.

With reference to FIG. 4, each of VR systems 110a, 110b, and 110c is an embodiment of the VR system 110. A VR server 120, for example, may be an embodiment of the processing unit 101. An instance of the application store 111 in VR server 120 provides a VR application among a plurality of VR applications to the VR systems 110a, 110b, and 110c. An instance of the tracking module 112 in VR server 120 may track positions and movement of a user 130a of the VR system 110a, a user 130b of the VR system 110b, and a user 130c of the VR system 110c. An instance of the VR engine 113 in VR server 120 may determine positions of avatars of the users 130a, 130b, and 130c and place the avatars in a scene of the provided VR application.

Figure 5:
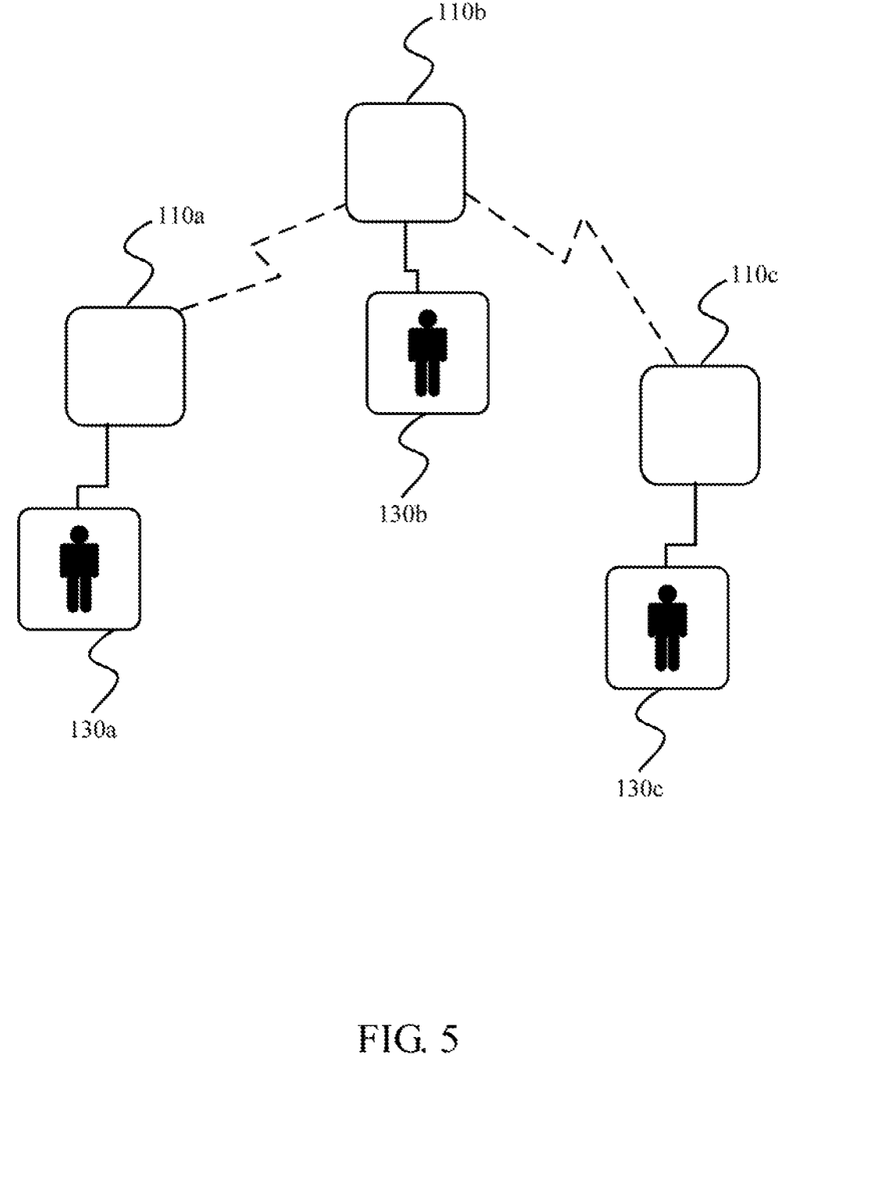
FIG. 5 is a block diagram of an embodiment of a plurality of participants joining a chat environment provided by a VR system of a participant.
Figure 6:
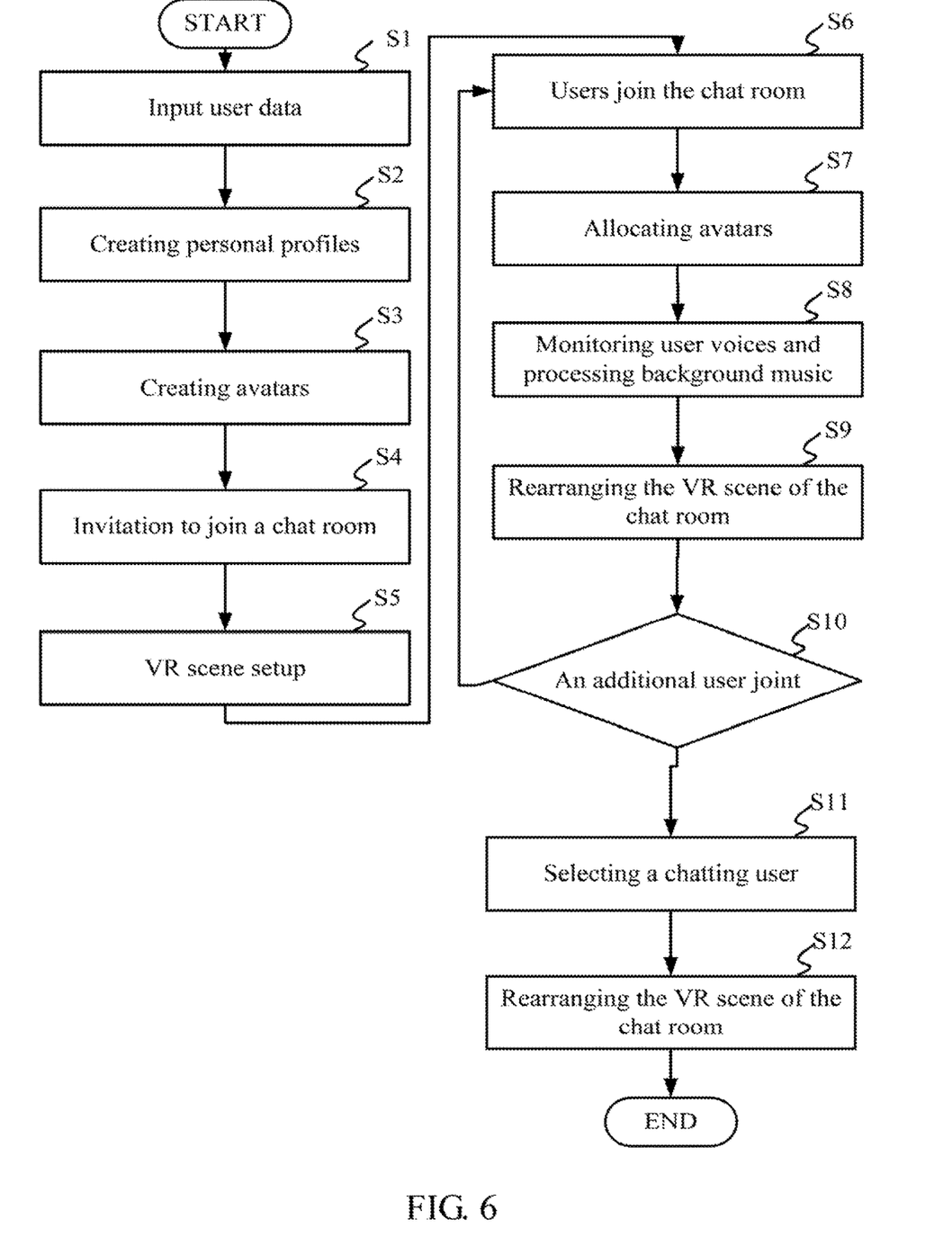
FIG. 6 is a block diagram of an embodiment of a method of the disclosure.

With reference to FIG. 5, for example, the processing unit 101 in the VR system 110b may function as the VR server 120. Any of the processing unit 101 that is in charge of executing a method of setting a multi-user VR chat environment as disclosed in FIG. 6 is referred to as a primary processing unit. For example, the primary processing unit is the VR server 120 in FIG. 4, and the primary processing unit is the processing unit 101 in the VR system 110b in FIG. 5. Alternatively, either one of the processing unit 101 in the VR system 110a or 110c in FIG. 5 may serve as the primary processing unit according to user operations With reference to FIG. 6, a primary processing unit receives user data of the users 130a, 130b, and 130c (Block S1) and creates personal profiles of the users 130a, 130b, and 130c based on the received user data (Block S2). The personal profile of the user, for example, may include a portrait image, gender, height, and weight of the user. The primary processing unit creates an avatar for each of the users 130a, 130b, and 130c based on the personal profiles of the users 130a, 130b, and 130c (Block S3). The primary processing unit receives an invitation to join a chat, for example, from the VR system 110a, and transfers the invitation to the VR systems 110b and 110c (Block S4). The primary processing unit allows the users to select a virtual reality scene from a plurality of virtual reality scenes, then sets up the selected VR scene of a VR application associated with the chat (Block S5). The primary processing unit allows each of the users 110a, 110b, and 110c to join the chat as a participant and allows the avatars of the users 110a, 110b, and 110c to enter the selected VR scene associated with the chat (Block S6).

Figure 7:
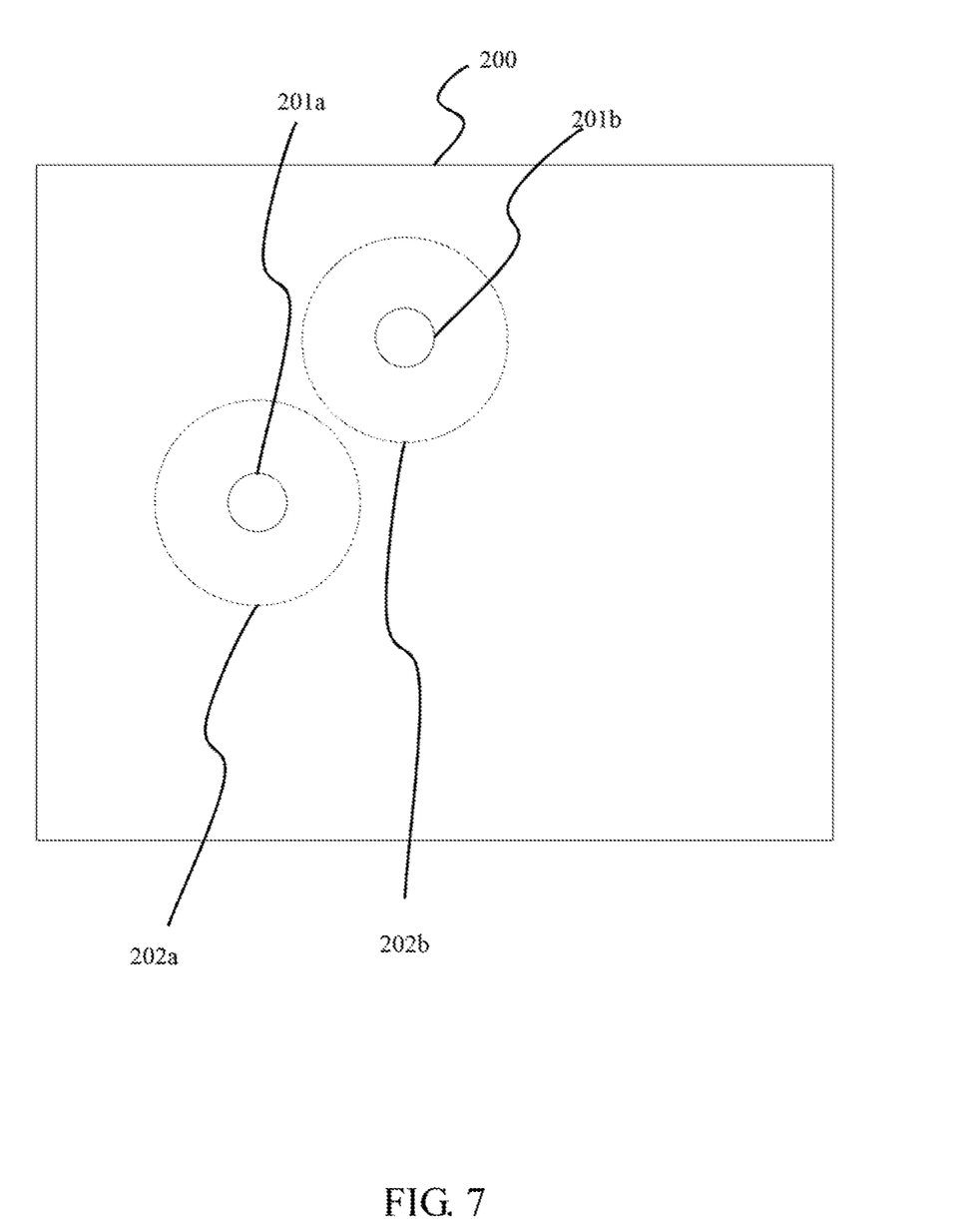
FIG. 7 is a block diagram of a VR chat scene.

With reference to FIG. 7, the primary processing unit allocates an avatar 201a of the user 130a and an avatar 201b of the user 130b into the VR chat scene 200 in Block S7.

The primary processing unit monitors user voices and processes background music in Block S8. As an example, the primary processing unit receives voice signals of the users 130a and 130b respectively from the VR system 110a and 110b.

The primary processing unit obtains a first volume value $x_1$ representing the volume of the voice signals associated with a speaking participant, such as the user 130a. The primary processing unit adjusts a distance between a first avatar of a first participant and a second avatar of a second participant in the VR chat scene from a first distance $y_1$ to a second distance $y_2$ according to the first volume $x_1$. The primary processing unit rearranges the selected VR scene and the avatars (Block S9). In the Block S9, the primary processing unit reduces the distance between the first avatar of the first participant and the second avatar of the second participant in the VR chat scene if at least one of the first volume value from the first participant and a second volume value from the second participant exceeds a volume threshold value $x_2$. For example, the primary processing unit obtains the second distance $y_2$ from a formula (1):

$$y_2 = \sqrt{\frac{y_1^2}{(10^{x_1-x_2/10})}} \quad (1)$$

Referring to FIG. 7, the primary processing unit interprets the definition of a free operating area 202a enclosing the avatar 201a of the user 130a and a free operating area 202b enclosing the avatar 201b of the user 130b.

Figure 8:
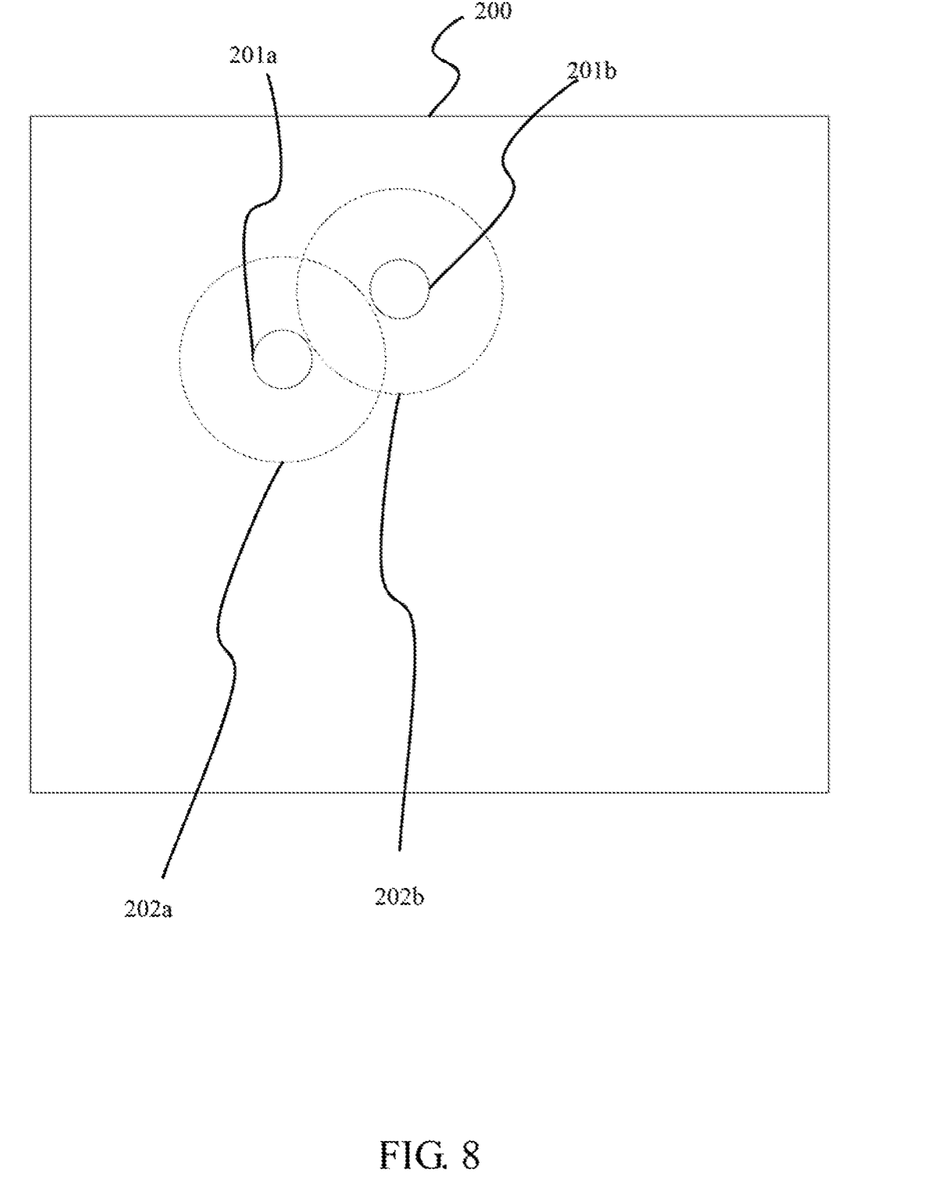
FIG. 8 is a block diagram of a VR chat scene.

In the Block S9, the primary processing unit rearranges the VR scene and prevents the first avatar of the first participant from entering a second free operating area of the second participant, and prevents the second avatar of the second participant from entering a first free operating area of the first participant while reducing the distance between the first avatar and the second avatar in the VR chat scene. With reference to FIG. 8, for example, the primary processing unit prevents the avatar 201a of the user 130a from entering the free operating area 202b of the user 130b and prevents the avatar 201b of the user 130b from entering the free operating area 202a while reducing the distance between the avatar 201a and the avatar 201b in the VR chat scene 200.

Figure 9:
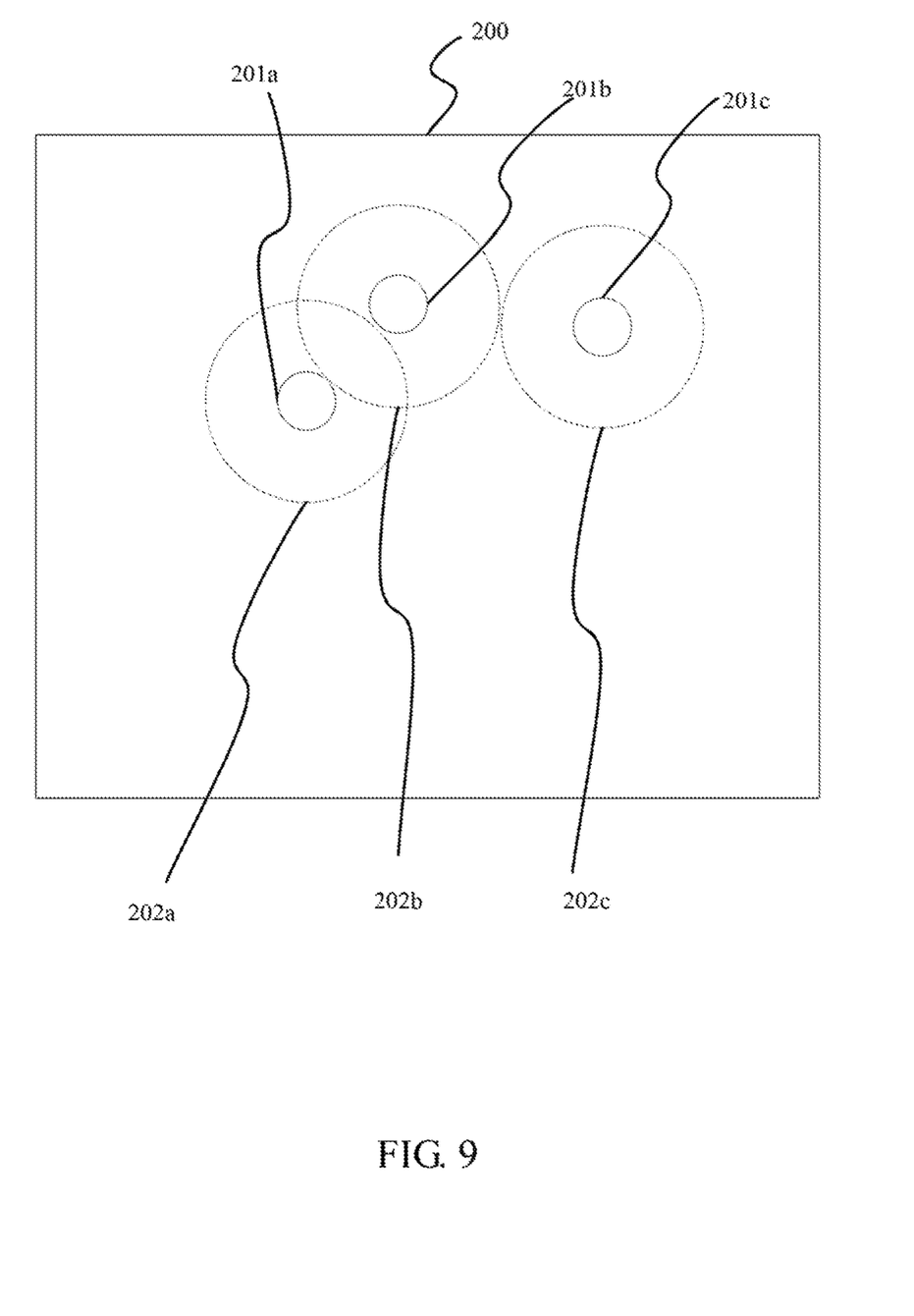
FIG. 9 is a block diagram of a VR chat scene.

The primary processing unit determines whether an additional participant joins the chat (Block S10)? With reference to FIG. 9, when a third participant, such as the user 130c, asks or is invited to join the chat, the primary processing unit allows the user 130c to join the chat (Block S6), places an avatar 201c of the user 130c into the VR chat scene 200 (Block S7), and receives voice signals of the users 130a, 130b, and 130c respectively from the VR system 110a, 110b, and 110c (Block S8). The primary processing unit rearranges the VR scene and the avatars (step S9). The primary processing unit identifies the definition of a free operating area 202c as a third free operating area enclosing the avatar 201c of the user 130c. In the Block S9, the primary processing unit rearranges the VR scene and prevents the third avatar of the third participant from entering the first free operating area, and the first avatar from entering the third free operating area while reducing the distance between the third avatar and the first avatar in the VR chat scene. The primary processing unit prevents the third avatar of the third participant from entering the second free operating area, and the second avatar from entering the third free operating area while reducing the distance between the third avatar and the second avatar in the VR chat scene.

The primary processing unit may relocate relative positions of the first avatar, the second avatar, and the third avatar according to the formula (1) while reducing the distance between the first avatar of the first participant and the second avatar of the second participant in the VR chat scene. Similarly, the primary processing unit may allow more participants to join the chat.

Figure 10:
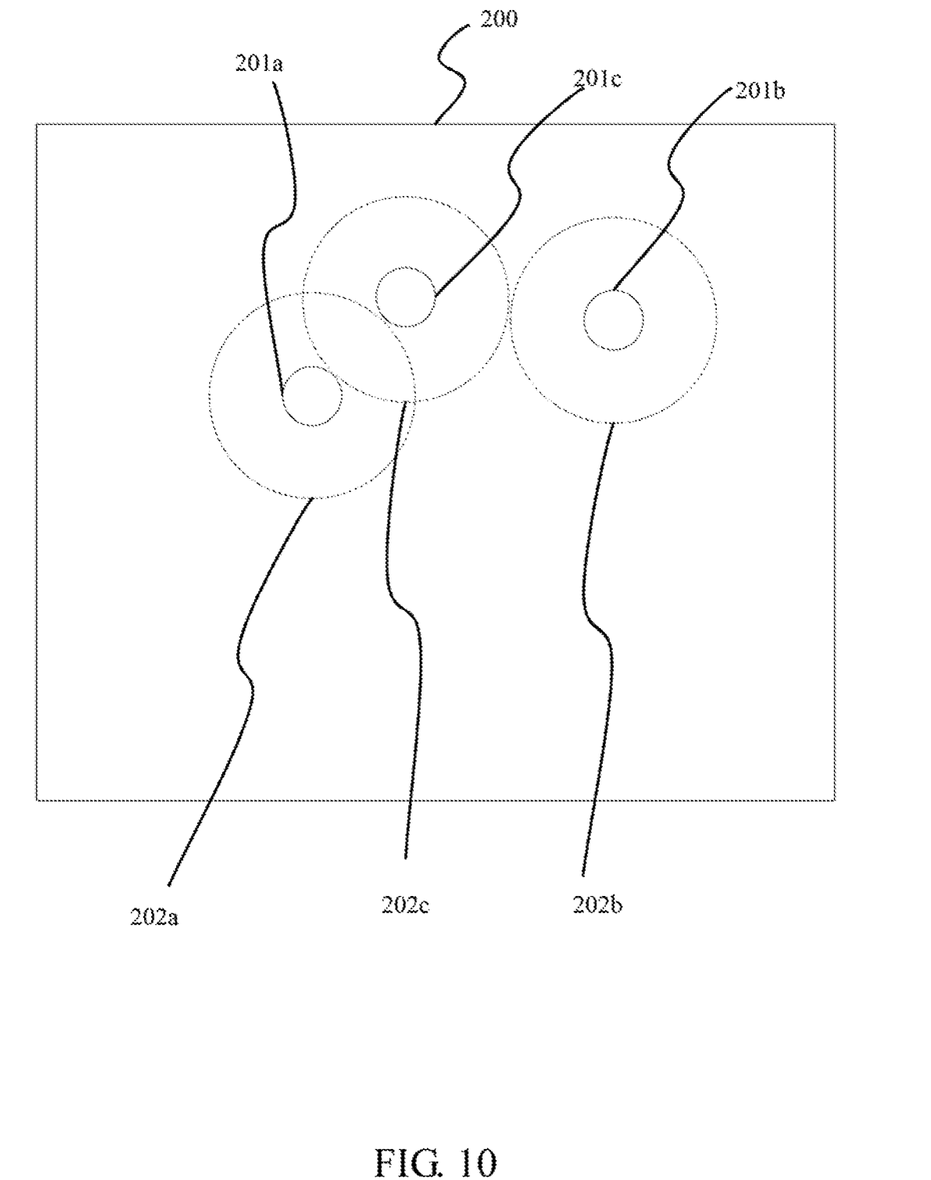
FIG. 10 is a block diagram of a VR chat scene.

The primary processing unit receives the selection of an active chat mode among a plurality of chat modes from a participant, such as the user 130a. When a whisper mode is selected and activated as the active chat mode, the primary processing unit receives the selection of a recipient participant solely receiving voice signals associated with the user 130a in the whisper mode Block S11. The selection may be issued from the VR system 110a by the user 130a. For example, the primary processing unit is notified by the VR system 110a that the user 130 selects 130c as the recipient participant solely receiving voice signals associated with the user 130a. The primary processing unit prompts a message to ask the user 130b agrees to change position and step back for the user 130c. With reference to FIG. 10, if the user 130b agrees to change position and step back for the user 130c, the primary processing unit rearranges positions of the avatars 201c and 201b and creates a channel dedicated to audio communication between the VR systems 110a and 110c.

Figure 11:
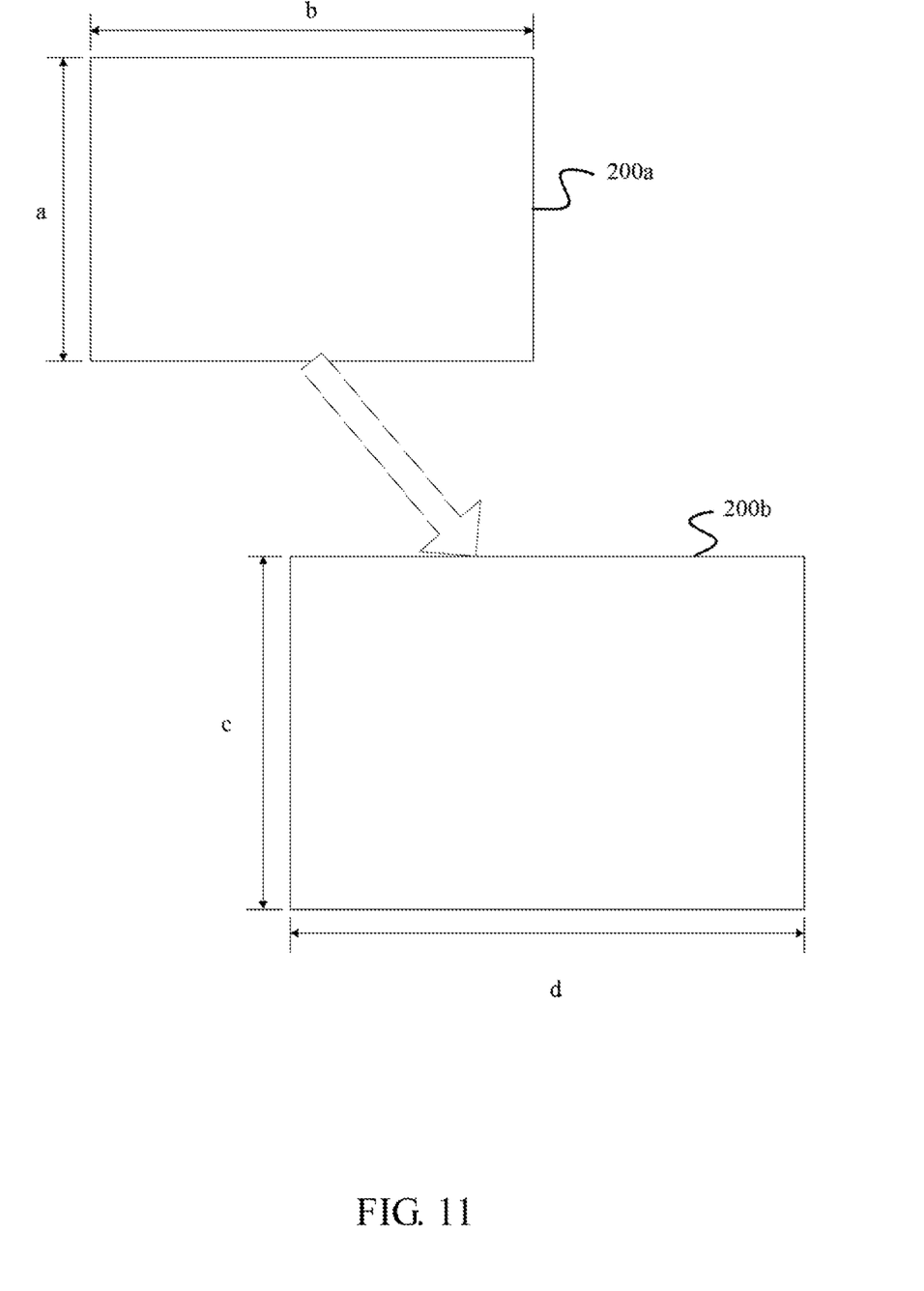
FIG. 11 is a block diagram showing VR chat scene adjustment.

The primary processing unit may adjust the dimension of the chat scene 200 according to a number of avatars in the scene 200, that is, the number of users joined to the chat. With reference to FIG. 11, a VR scene 200a is an instance of the chat scene 200 before the adjustment, and a VR scene 200b is an instance of the chat scene 200 after the adjustment. The dimension of the chat scene 200a is measured by a width Y1 and a length X1. The magnitude of the chat scene 200a is measured by a width Y2 and a length X2. The primary processing unit may complete the scene adjustment by transiting the scene 200a to VR scene 200b in a transition period T.

The primary processing unit may determine the transition period T to complete the scene adjustment using a lookup table. For example, the primary processing unit uses Table 1 to retrieve one index D among indices D1, D2, D3, D4, and D5.

TABLE 1

| | X1 | | | | |
|---|---|---|---|---|---|
| (X2 − X1) | >200 | 200~150 | 150~100 | 100~50 | <50 |
| >100 | D1 | D2 | D3 | D4 | D5 |
| 100~75 | D2 | D3 | D4 | D5 | D5 |
| 75~50 | D3 | D4 | D5 | D5 | D5 |
| 50~25 | D3 | D4 | D5 | D5 | D5 |
| <25 | D3 | D4 | D5 | D5 | D5 |

The primary processing unit obtains a parameter S according to the following formula (2):

$$S = \left| \frac{X1 - X2}{X1} \right| \quad (2)$$

The primary processing unit uses the parameter S and Table 2 to retrieve one value K among time value K1, K2, K3, K4, and K5 and designates K to be the value of the transition period T. The primary processing unit performs and completes VR scene adjustment within the period T.

TABLE 2

|    | S      |         |         |         |       |
|----|--------|---------|---------|---------|-------|
| D  | >0.4   | 0.4~0.3 | 0.3~0.2 | 0.2~0.1 | <0.1  |
| D1 | K1     | K2      | K3      | K3      | K3    |
| D2 | K2     | K3      | K4      | K4      | K4    |
| D3 | K3     | K4      | K5      | K5      | K5    |
| D3 | K4     | K5      | K5      | K5      | K5    |
| D3 | K5     | K5      | K5      | K5      | K5    |

In conclusion, the present application discloses methods for setting a multi-user virtual reality chat environment, adjusting a distance between avatars of participants in the VR chat scene from a first distance to a second distance according to the detected volume of the participants. VR scene adjusting may proceed in a limited time period determined based on a lookup table. The method allows whisper between two VR chat scene participants in a whisper mode.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A device for setting a multi-user virtual reality chat environment comprising:
   one or more processors;
   a memory coupled to the one or more processors providing a plurality of virtual reality (VR) scenes, the memory storing a plurality of instructions executable by the one or more processors, the plurality of instructions comprises;
   allowing selection of a VR chat scene from the plurality of virtual reality scenes;
   allowing a first participant and a second participant to join the selected VR chat scene;
   placing a first avatar of the first participant and a second avatar of the second participant into the selected VR chat scene;
   receiving voice signals associated with the first participant and voice signals associated with the second participant;
   obtaining a first volume value representing a volume of the voice signals associated with the first participant and a second volume value representing a volume of the voice signals associated with the second participant;
   reducing a distance between the first avatar of the first participant and the second avatar of the second participant in the VR chat scene from a first distance to a second distance based on the obtained first volume and the second volume value;
   determining a time period to complete the reducing the distance according to a difference between the first distance and the second distance, wherein the time period is determined using a lookup table; and
   rearranging a position of at least one of the first avatar and the second avatar when the reducing the distance is completed according to the determined time period so as to create a channel dedicated to an audio communication between a virtual reality system of the first avatar and a virtual reality system of the second avatar.

2. The device of claim 1, further comprising: reducing the distance between the first avatar of the first participant and the second avatar of the second participant in the VR chat scene if at least one of the first volume and the second volume value exceeds a volume threshold value.

3. The device of claim 1, further comprising: defining a first free operating area enclosing the first avatar of the first participant and a second free operating area enclosing the second avatar of the second participant, and preventing the first avatar of the first participant from entering the second free operating area and the second avatar of the second participant from entering the first free operating area while reducing the distance between the first avatar of the first participant and the second avatar of the second participant in the VR chat scene.

4. The device of claim 3, further comprising: allowing a third participant to join the virtual reality chat; placing a third avatar of the third participant into the VR chat scene; defining a third free operating area enclosing the avatar of the third participant; and preventing the third avatar of the third participant from entering the first free operating area and the second free operating area and the first avatar of the first participant and the second avatar of the second participant from entering the third free operating area while reducing a distance between the first avatar of the third participant and the second avatar of the second participant in the VR chat scene.

5. The device of claim 4, further comprising: relocating relative positions of the first avatar, the second avatar, and the third avatar while reducing the distance between the first avatar of the first participant and the second avatar of the second participant in the VR chat scene.

6. The device of claim 4, further comprising: receiving a selection of an active chat mode among a plurality of chat modes from the first participant, and receiving a selection of a recipient participant solely receiving voice signals associated with the first participant from the first participant when the active chat mode is a whisper mode.

* * * * *